(12) United States Patent
Haley et al.

(10) Patent No.: US 7,809,546 B2
(45) Date of Patent: *Oct. 5, 2010

(54) SYSTEM AND METHOD FOR EMULATING SERIAL PORT COMMUNICATION

(75) Inventors: Neil Haley, Hudson, MA (US); Justin Maynard, Groton, MA (US)

(73) Assignee: Egenera, Inc., Marlboro, MA (US)

( * ) Notice: Subject to any disclaimer, the term of this patent is extended or adjusted under 35 U.S.C. 154(b) by 519 days.

This patent is subject to a terminal disclaimer.

(21) Appl. No.: 11/799,294

(22) Filed: May 1, 2007

(65) Prior Publication Data

US 2007/0203686 A1   Aug. 30, 2007

Related U.S. Application Data

(63) Continuation of application No. 10/428,713, filed on May 2, 2003, now Pat. No. 7,228,265.

(51) Int. Cl.
*G06F 9/455* (2006.01)
(52) U.S. Cl. .............................. 703/25; 703/21; 703/23; 703/24
(58) Field of Classification Search .................. 703/21, 703/23, 24, 25; 710/300; 713/2
See application file for complete search history.

(56) References Cited

U.S. PATENT DOCUMENTS

| | | |
|---|---|---|
| 4,855,905 A | 8/1989 | Estrada et al. |
| 4,954,101 A | 9/1990 | Nelson |
| 5,113,522 A | 5/1992 | Dinwiddie, Jr. et al. |
| 5,230,052 A | 7/1993 | Dayan et al. |
| 5,408,636 A | 4/1995 | Santeler et al. |

(Continued)

FOREIGN PATENT DOCUMENTS

EP    980189    2/2000

(Continued)

OTHER PUBLICATIONS

Wu, "An Interface Design and Implementation for a Proposed Network Architecture to Enhance the Network Performance", MSEE thesis, California Polytechnic State University, Jul. 2000.*

(Continued)

*Primary Examiner*—Kamini S Shah
*Assistant Examiner*—Herng-Der Day
(74) *Attorney, Agent, or Firm*—Wilmer Cutler Pickering Hale and Dorr LLP

(57) ABSTRACT

A method and system of emulating serial com port communication. A computer processing system has computer-executable operating system instructions including first instructions that interact with a first serial device according to a predefined input/output (I/O) hardware interface. A first serial device has a receive port and a transmit port and has the predefined (I/O) hardware interface. A second serial device has a receive port and a transmit port. The transmit port of the first serial device is in serial communication with the receive port of the second serial device, and the receive port of the first serial device is in serial communication with the transmit port of the second serial device. Computer-executable instructions emulate serial communication port device communication and include instructions that transmit information over another medium in response to receive requests from the second serial device.

20 Claims, 7 Drawing Sheets

U.S. PATENT DOCUMENTS

| | | | |
|---|---|---|---|
| 5,574,943 A | 11/1996 | Daftari | |
| 5,721,842 A | 2/1998 | Beasley et al. | |
| 5,802,348 A | 9/1998 | Stewart et al. | |
| 5,812,552 A | 9/1998 | Arora et al. | |
| 5,960,455 A | 9/1999 | Bauman | |
| 6,068,661 A | 5/2000 | Shari | |
| 6,190,190 B1 | 2/2001 | Daly et al. | |
| 6,195,687 B1 | 2/2001 | Greaves et al. | |
| 6,199,133 B1 | 3/2001 | Schnell | |
| 6,378,014 B1 * | 4/2002 | Shirley | 710/100 |
| 6,397,256 B1 | 5/2002 | Chan et al. | |
| 6,571,357 B1 | 5/2003 | Martin et al. | |
| 6,625,144 B1 | 9/2003 | El-Batal et al. | |
| 6,715,074 B1 | 3/2004 | Chaiken | |
| 6,732,068 B2 | 5/2004 | Sample et al. | |
| 6,836,757 B1 | 12/2004 | Swoboda | |
| 6,862,564 B1 | 3/2005 | Shue et al. | |
| 7,174,390 B2 * | 2/2007 | Schulter et al. | 709/245 |
| 7,228,265 B2 * | 6/2007 | Haley et al. | 703/25 |
| 2002/0156612 A1 | 10/2002 | Schulter et al. | |

FOREIGN PATENT DOCUMENTS

WO    WO-01/47199    6/2001

OTHER PUBLICATIONS

"Twisted Pair", Wikipedia, Nov. 2006, http://en.wikipedia.org/wiki/Twister_par, pp. 1-4.

"What is Twisted Pair?", SearchDataCenter.com, 2005, http://searchdatacenter.techtarget.com/sDefinition/0,,sid80_gci213234,00.html, pp. 1-3.

Chapter 4, "Cabling", Florida Center for Instructional Technology, University of South Florida, 1997-2005, http://fcit.usf.edu/network.chap4/chap4.htm, pp. 1-5.

Computer Networks and Internets, Second Edition (Douglas E. Comer) 1999, pp. 55-59.

Seyer, M.D., "RS-232 Made Easy: Connecting Computers, Printers, Terminals and Modems", 1991, pp. xi, 42, 63-71.

Sheridan, W., "How to Make and Use Null Modem Cables", Data Communications, abstract, pp. 1-2, 1987.

Symantec, pcAnywhere version 32, User's Guide, 1997, pp. 1-226.

TCP/IP Illustrated, vol. 2 (The Protocols, W. Richard Stevens), Nov. 2001, pp. 9-10, 209.

* cited by examiner

SYSTEM AND METHOD FOR EMULATING SERIAL PORT COMMUNICATION

CROSS REFERENCE TO RELATED APPLICATIONS

This is a continuation application of U.S. patent application Ser. No. 10/428,713 filed on May 2, 2003, the entire contents of which are incorporated herein by reference.

BACKGROUND

1. Field of the Invention

The present invention relates to serial port communication and, more specifically, to efficiently emulating serial port communication.

2. Description of the Related Art

Conventional computing systems use a serial port to communicate with basic peripherals like the console display and keyboard. The console is used, for example, for system administration messages, kernel error messages, security events, debugging, and/or other purposes.

FIG. 1 depicts the architecture and components of an exemplary arrangement of serial communication. Communication may originate in the upper layers of operating system software 102 (or perhaps even in applications, not shown). The upper layers 102 transmit such requests to corresponding device driver software 108 via a predefined driver model interface 104. The device driver 108, in turn, communicates send (S) and receive (R) messages to the serial com port device 112 via a predefined hardware interface 113. The device 112 transmits and receives such messages via path 116 to connected peripheral 118. The connected peripheral is typically a computer with a serial port and attached keyboard and video devices running terminal emulation software, such as HyperTerm to provide a console and keyboard interface. Analogously, communication may also be conducted via BIOS 110, through the predefined BIOS interface 106. The BIOS logic for serial communication uses the same hardware interface 113 for the serial port device.

In some computing platforms, the processor environment does not include the basic peripherals such as a console display or keyboard. Instead these devices are typically located remotely. For example, FIG. 2 is a high-level architectural diagram of the BladeFrame™ computing platform, as described in U.S. patent application Ser. No. 10/038,354, filed Jan. 4, 2002, entitled Address Resolution Protocol System and Method in a Virtual Network, published on Oct. 24, 2002, which is hereby incorporated by reference in its entirety. Processor nodes 205 have processors 207 which inter-communicate with each other via a communication fabric (e.g., Giganet fabric) 210 and 215. Control nodes may also communicate on the communication fabric and also communicate with management logic 235 which (for present purposes) may be considered to have a keyboard and display to act as a console for a processing network.

For environments, such as FIG. 2, serial communication normally associated with the console may be achieved by a system as depicted in FIG. 3. The upper layers of the OS 102' transmit communication messages to driver 302 via the conventional driver model interface 104 for the serial port driver. The driver 302 has a device driver front end 308 that "looks like" and "acts like" the conventional serial com port driver (e.g., driver 108 of FIG. 1), at least from the perspective of the OS 102. The driver 302, however, includes emulation logic 310 that communicates over an alternative medium 312 (i.e., not a conventional serial link) to serial devices 118. In the example of FIG. 2 the other medium 312 includes the communication fabric 210. For example, the emulation logic 310 in driver 302 may "wrap" the serial port communication in special packets to be delivered to the control blade where they can be "unwrapped" and the data therein may be used to communicate with the appropriate peripheral. It should be appreciated that this other medium may be quite complicated. For example, in FIG. 2, the control nodes 220 may include special forwarding logic for detecting serial communication requests and reformatting and forwarding such requests yet again on a different physical medium or using a different protocol. Notice in the environment of FIG. 3 there is no serial com port device 112.

For certain processing contexts, the above approach of emulation via a device driver is incomplete. FIG. 4, for example, illustrates the situation presented in some environments. Some operating systems 102', and other low-level software, expect to communicate directly 402 with the hardware interface 113 of the serial port device, bypassing any device drivers and Basic Input/Output System (BIOS). Consequently, emulating serial communication with an approach like FIG. 3 will not work for such direct communication.

SUMMARY

According to one or more embodiments of the present invention, there is provided a method and system of emulating serial com port communication.

Under one aspect of the invention, a computer processing system has computer-executable operating system instructions including first instructions that interact with a first serial device according to a predefined input/output (I/O) hardware interface. A first serial device has a receive port and a transmit port and has the predefined (I/O) hardware interface. A second serial device has a receive port and a transmit port. The transmit port of the first serial device is in serial communication with the receive port of the second serial device, and the receive port of the first serial device is in serial communication with the transmit port of the second serial device. Computer-executable instructions emulate serial communication port device communication and include instructions that transmit information over another medium in response to receive requests from the second serial device. The transmitted information includes information representative of the receive request from the second device. Transmissions to the first serial device by the operating system instructions are transmitted over the other medium and serial communication port device communication is thereby emulated over the other medium.

Under another aspect of the invention, the emulation instructions further include instructions, responsive to a communication received from the other medium, that transmit information representative of the received communication to the transmit port of the second serial device.

Under another aspect of the invention, the emulation instructions operate in response to events generated by the second serial device.

Under another aspect of the invention, the emulation system communicates with at least one console device.

Under another aspect of the invention, the other medium comprises a packet-based network.

Under another aspect of the invention, the other medium comprises a cell-based network.

Under another aspect of the invention, the operating system communicates directly and solely with the predefined I/O hardware interface.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

The above-mentioned and other advantages and features of the present invention will be better understood from the following detailed description of the invention with reference to the accompanying drawings, in which.

DETAILED DESCRIPTION

Preferred embodiments of the invention provide a system and method for emulating serial com port communication. These embodiments are cost-effective and require minimum hardware. At the same time they allow emulation over alternative transports (i.e., not the conventional serial communication links associated with Com ports) so that a console (keyboard and display) may be placed remotely. This approach is useful for any type of processing platform in which the processor boards or nodes lack such peripherals, and in which such peripherals are located remotely.

Figure 5:
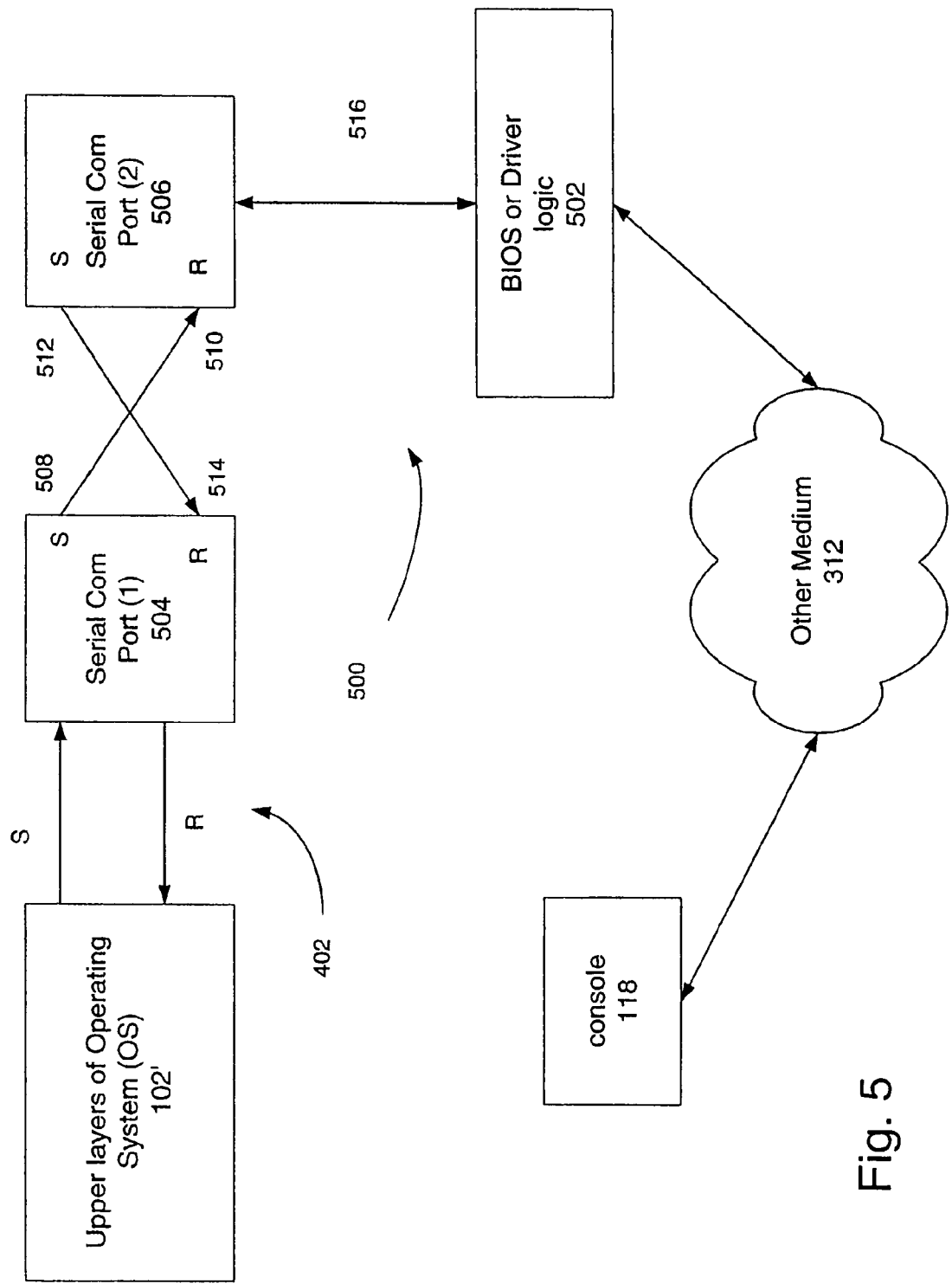
FIG. 5 depicts serial com port emulation system according to certain embodiments of the invention.

FIG. 5 depicts a serial port emulation system 500 according to certain embodiments of the invention. The system 500 includes cross-connected serial Com ports 504 and 506 in conjunction with BIOS or driver logic 502. The system 500 and the OS 102' (shown in this figure) all operate on a given processor board, in preferred embodiments. The alternative medium 312, which is described below, may take many forms and provides a communication transport to the console devices 118.

Within system 500, serial com port devices 504 and 506 are conventional serial com port devices. They are cross-connected using conventional links but in an advantageous arrangement. Specifically, the send output port 508 of device 504 is connected to the receive input port 510 of device 506.

The send output port 512 of device 506 is connected to the receive input port 514 of device 504.

Serial com port device 504 has an exposed hardware interface 402, e.g., "COM Port 1". Operating system software 102' can communicate directly with device 504 and effectively take sole control of such device and such interface (meaning other software is not allowed to access the hardware interface of device 504).

Serial com port device 506 is likewise a conventional device. Its hardware interface is not exposed to the operating system software 102', however. It has a hardware interface 516 that is known to BIOS or driver logic 502 but is otherwise not exposed to other software. The interface 516 includes an interrupt mechanism and interrupt dispatch table to invoke BIOS or driver logic 502.

Figure 1:
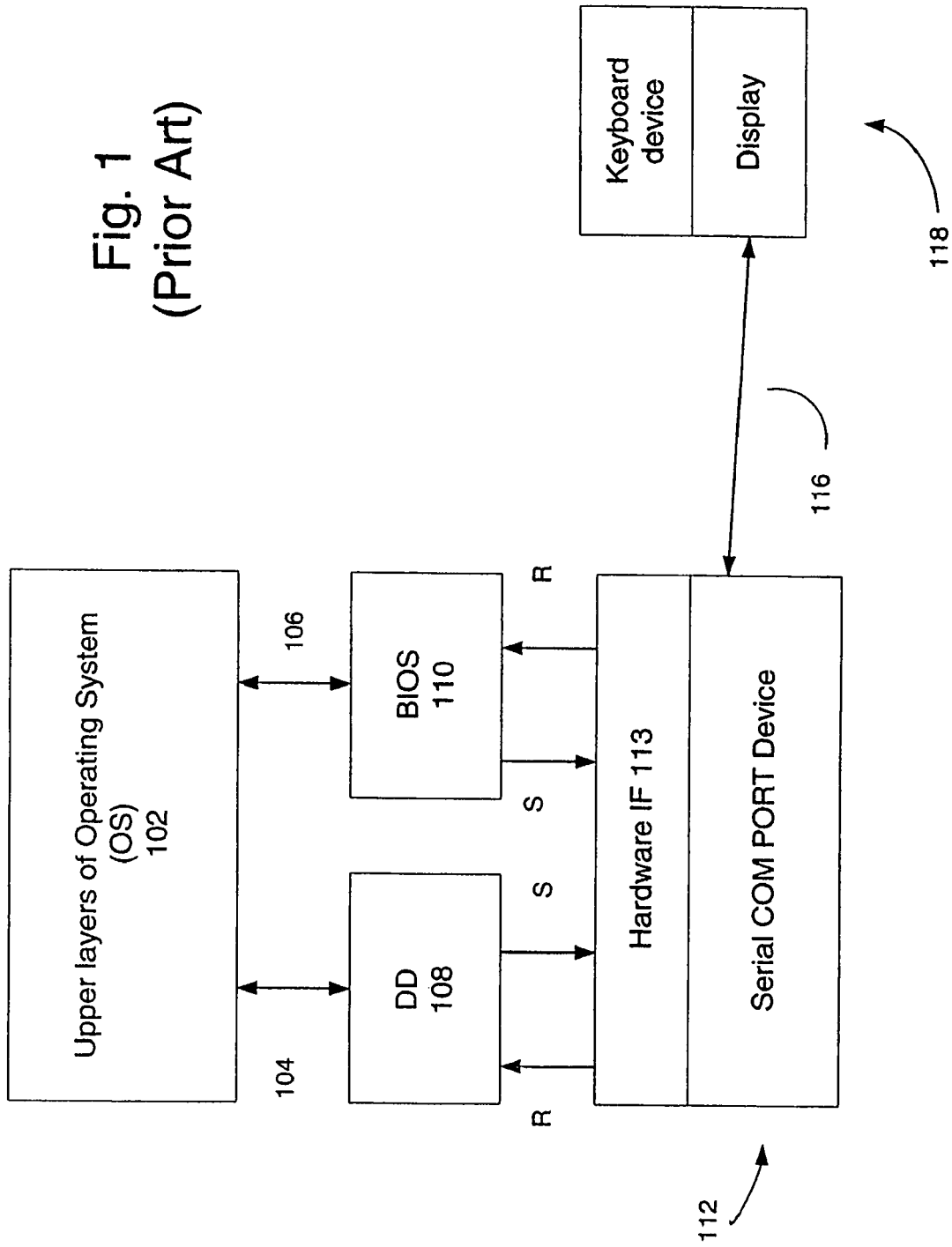
FIG. 1 depicts prior art communication system using serial com port devices to communicate with console devices.
Figure 2:
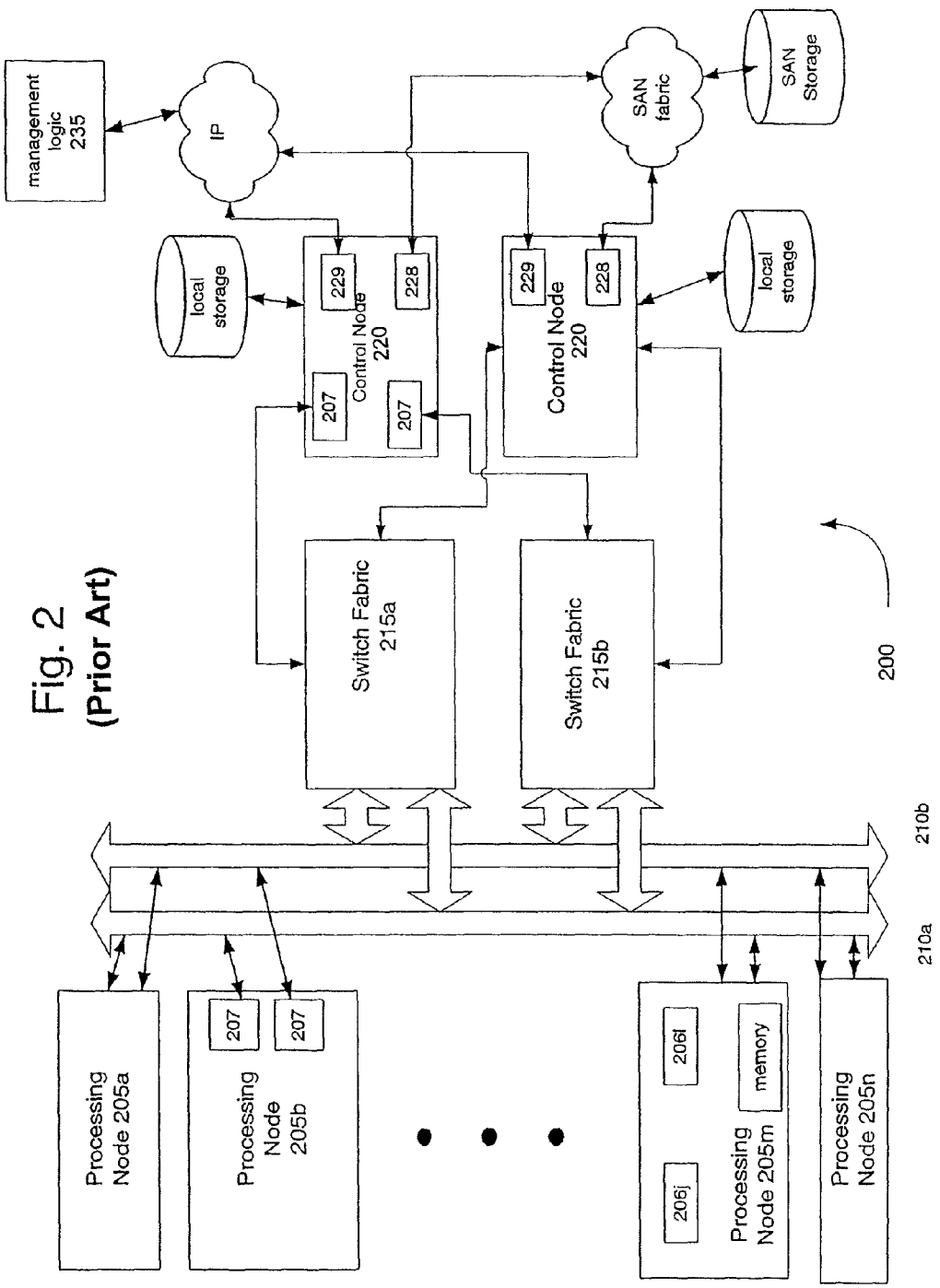
FIG. 2 depicts prior art processing platform in which certain contexts lack console devices and serial com port communication therewith.
Figure 3:
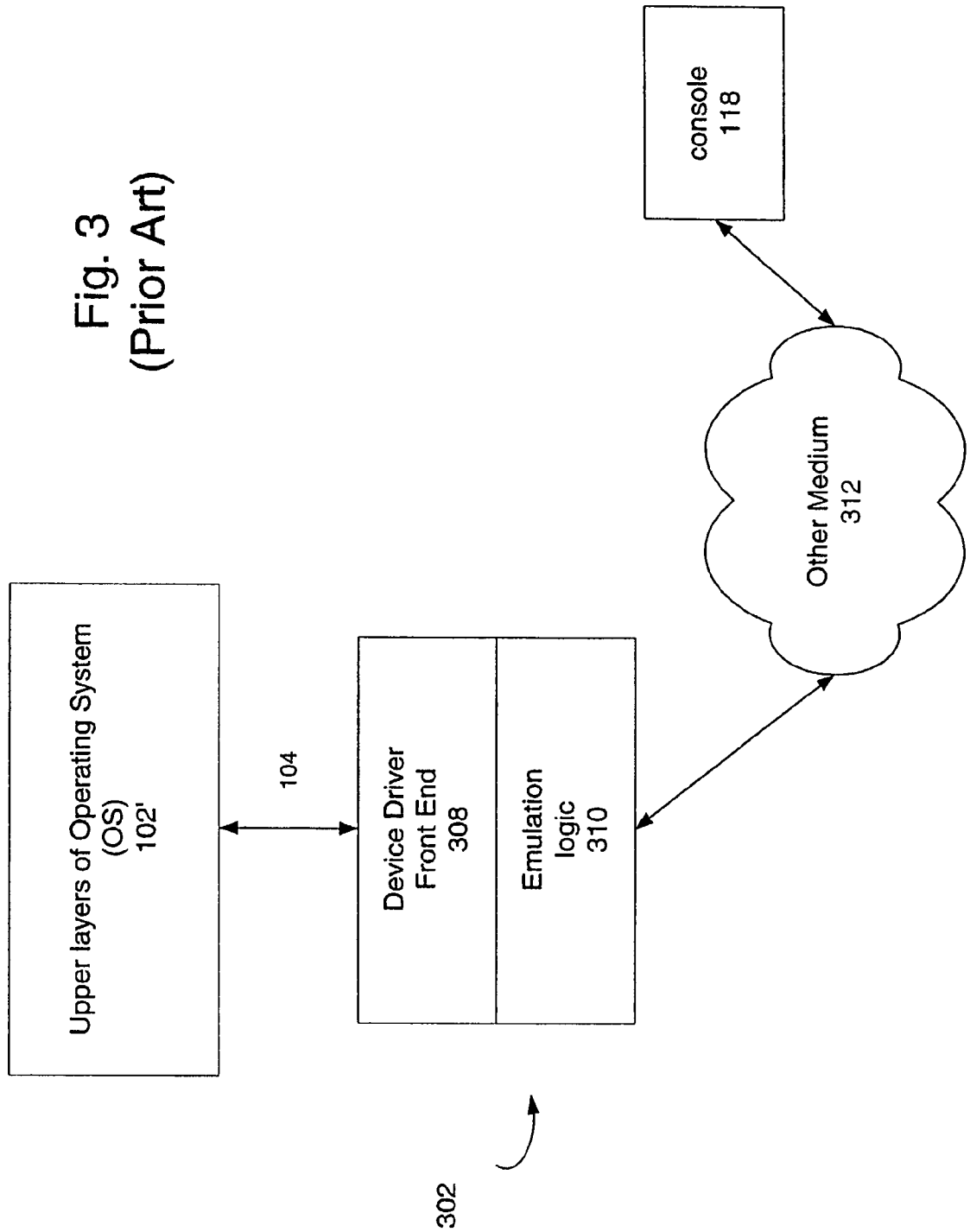
FIG. 3 depicts prior art serial com port emulation approach.
Figure 4:
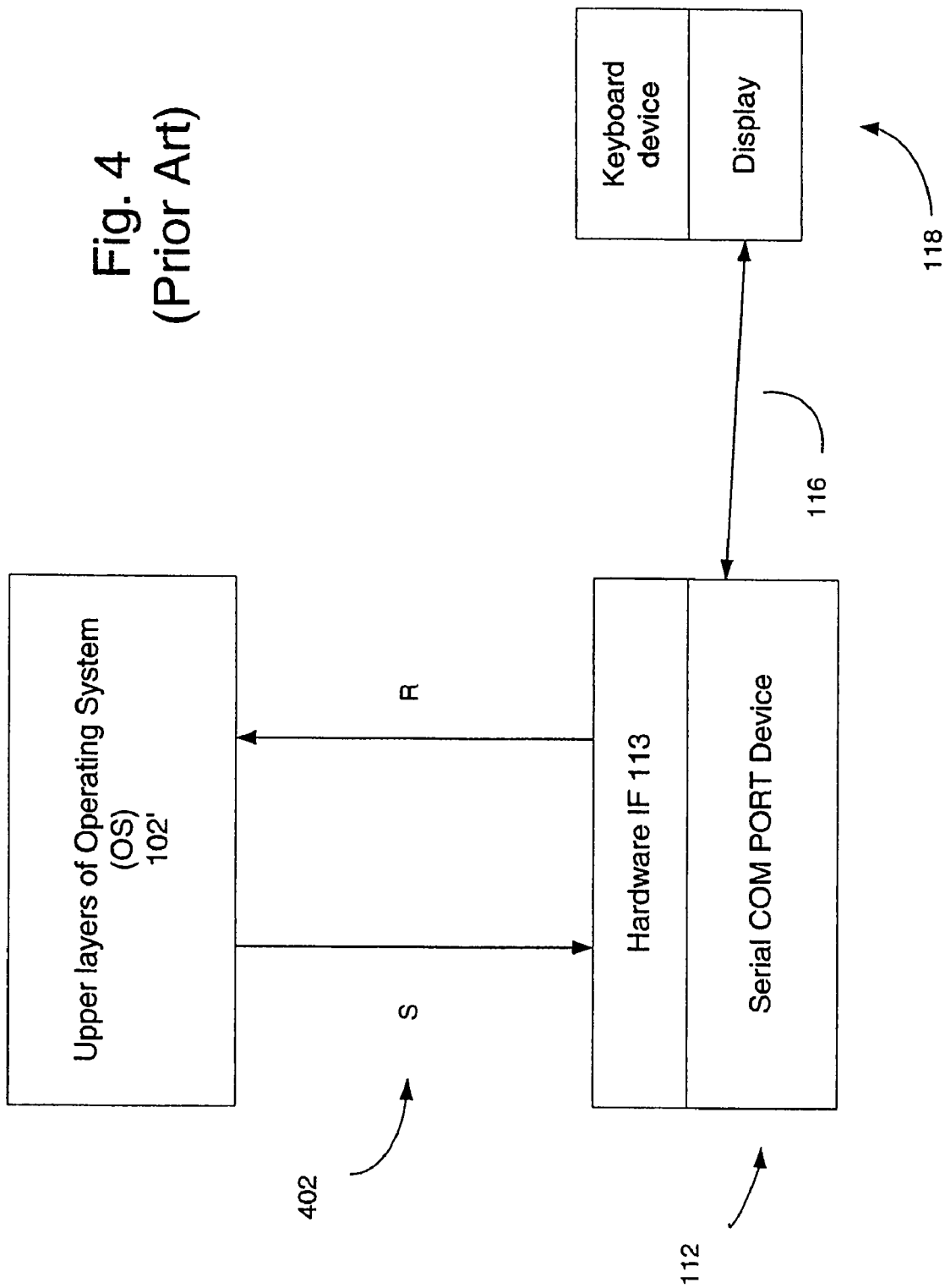
FIG. 4 depicts prior art operating system environment in which the OS directly communicates with serial com port hardware.

The BIOS or driver logic 502 is analogous to the logic 302 of FIG. 3 in that it includes emulation logic to respond to serial com port communications and convey such communications on to another medium 312 and vice versa. For example, in an exemplary context like FIGS. 2-3, the driver logic 502 receives serial com port communications from cross-connected ports 504 and 506 and wraps the communication into packets for delivery onto a communication fabric 210, 215. Likewise it receives communications from the fabric 210, 215 and conveys such to the cross-connected com ports 504 and 506.

Figure 6:
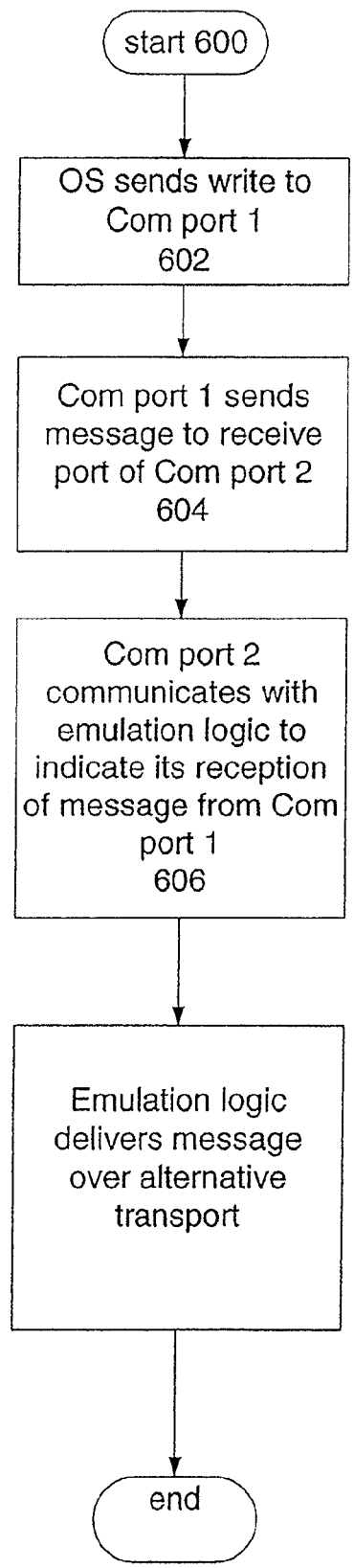
FIG. 6 depicts send path communication flow according to certain embodiments of the invention.

FIG. 6 is a flow chart illustrating the send path communications flow according to a preferred embodiment. The flow starts at 600 and proceeds to step 602 when the OS 102' writes directly to the serial com port device 504. (Device 504 is the device having the hardware interface exposed to the OS 102'.) In step 604, device 504 transmits the communication just received on its input out on its send port 508 to be received by receive port 510 on serial com port device 506. In step 606, device 506 communicates with the BIOS or driver logic 502 to indicate that device 506 has received a message. Conventionally, this may be done by causing an interrupt that will eventually cause the processing system to dispatch to the interrupt service routine, i.e., BIOS or driver logic 502. The logic 502 then delivers the message over alternative transport 312 to a console 118. For example, in the case of certain packet-based mediums the logic may involve wrapping the serial communication in a corresponding packet and sending it to the appropriately addressed entity. In a context like FIG. 2, this may include addressing communication to a control node for subsequent forwarding to a console.

Figure 7:
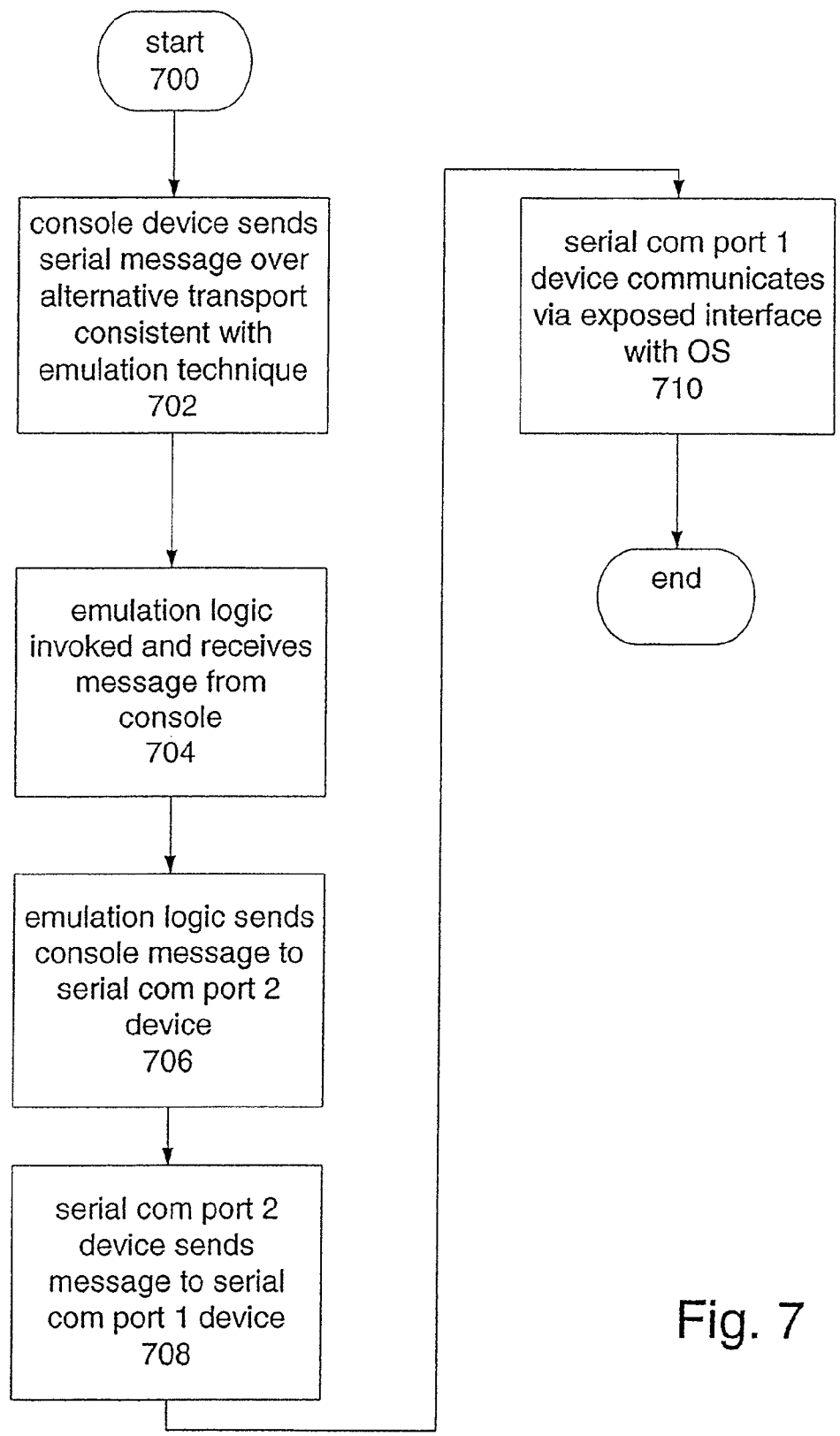
FIG. 7 depicts receive communication flow according to certain embodiments of the invention.

FIG. 7 is a flow chart illustrating the receive path communications flow according to a preferred embodiment. The flow starts at 700 and proceeds to step 702 when a console device (e.g., keyboard) sends a communication to the relevant processor. This communication will be carried over an alternative transport consistent with the emulation approach being employed, and eventually causes the invocation of the BIOS or driver logic 502, in step 704. In step 706, the BIOS or driver logic 502 communicates with the serial com port 2 device 506 via the interface 516. This communicates a send transmission to device 506. In step 708, the serial com port device 506 sends the message it just received (i.e., from the console) on send port 512, where it is received by serial com port device 504 on its receive port 514. In step 710, the serial com port 1 device sends the message it just received on its receive port via the exposed interface 402 to the operating system 102', which handles the message accordingly, e.g., changing its state.

The above embodiments described logic 502 as BIOS or driver logic because the emulation logic may be contained in either, under certain embodiments. Certain preferred embodiments have the emulation logic at least in logic that can be invoked as a BIOS service, e.g., during early stages of booting.

The above embodiments need not be the sole form of serial com port emulation within a given system. For example, other com ports can be completely virtualized and emulated. For these com ports, direct access by the OS would be prohibited. Any software would need to access the com port via an associated driver or the like, and these com ports would operate analogously to FIG. 3.

Advantageously, according to one or more embodiments of the present invention, the different transport 312 may be shared with other devices. For example, in the example of FIG. 2 the alternative medium would include the communication fabric 210, 215, which is used by the processors for inter-processor communication and the like. Various type of network mediums may be used; e.g., packet-based, cell-based, frame-based, TDM-based, to name a few.

In some environments the alternative medium need not be shared in such a sense but instead is an alternative medium to the conventional links used to connect console devices and otherwise used for serial com port communication.

As one example, the computer system may include a general purpose computer, or a specially programmed computer. A computer system may be implemented as a distributed computer system rather than on a single computer processor. Similarly, a communications network may be employed which may be, by way of example, a packet communications network, the Internet, an intranet, an Ethernet, or other networks. Moreover, processing could be controlled by a software program on one or more computer systems or processors, or could even be partially or wholly implemented in hardware.

The method of the invention may have been described in connection with particular steps. The present invention is not limited to a particular order of steps. It is intended to be provided in any order of steps where possible.

Moreover, the invention is not limited to any particular operating system. The invention has been discussed in connection with a particular example of an operating system, however, the principals may apply equally to other operating systems. Similarly, the invention may be provided in connection with a BIOS and/or any other stage of operating system and/or application software.

In addition, the embodiments described above included logic 502 configured at an appropriate set of addresses to be invoked by either serial com port 2 or by messages from the alternative transport 312. In certain embodiments, the logic 502 may be configured in place using a virtual BIOS technique described in co-pending U.S. patent application Ser. No. 10/428,682, filed on even date herewith and entitled System And Method For Virtualizing Basic Input/Output System (Bios) Including Bios Run Time Services.

Under certain embodiments the operating system may take sole control of the serial device and for example communicate directly with the device as described above. However, the operating system may release such control and when this is done other software may communicate with the device; for example, software may communicate via a device driver to the serial device and the system will operate as described above, except that the communication now originates with software other than the operating system.

The foregoing detailed description includes many specific details. The inclusion of such detail is for the purpose of illustration only and should not be understood to limit the invention. In addition, features in one embodiment may be combined with features in other embodiments of the invention. Various changes may be made without departing from the scope of the invention as defined in the following claims.

What is claimed is:

1. In a computer processing system having a processor including an operating system having computer-executable operating system instructions including instructions for communicating with a first serial device directly using a first medium according to a predefined input/output (I/O) hardware interface, a serial communication port emulation system to provide serial port communication over an alternate medium, comprising:

the first serial device connected to said processor and operating under the control of said operating system, the first serial device having a receive port and a transmit port and having the predefined I/O hardware interface;

a second serial device connected to said processor and operating under the control of BIOS or driver software instructions executed on said processor, the first serial device and second serial device residing within said computer processing system, the second serial device having a receive port and a transmit port, the transmit port of the first serial device being in serial communication with the receive port of the second serial device, and the receive port of the first serial device being in serial communication with the transmit port of the second serial device; and computer-executable instructions, responsive to serial port communication between the first serial device and the second serial device, to emulate serial communication port communication over the alternate medium and conveying a message on the alternate medium.

2. The computer processing system of claim 1, wherein the emulation instructions further include instructions, responsive to a communication received from the alternate medium, that transmit information representative of the received communication to the transmit port of the second serial device, wherein the second serial device then conveys the received communication to the receiver port of the first serial device and the first serial device conveys the received communication to the operating system instructions.

3. The computer processing system of claim 2, wherein the alternate medium comprises a packet-based network.

4. The computer processing system of claim 2, wherein the alternate medium comprises a cell-based network.

5. The computer processing system of claim 1, wherein the emulation instructions operate in response to events generated by the second serial device.

6. The computer processing system of claim 1, wherein the emulation system communicates with at least one console device.

7. The computer processing system of claim 1, wherein the operating system communicates directly and solely with the predefined I/O hardware interface.

8. The computer processing system of claim 1, wherein the alternate medium comprises a frame-based network.

9. The computer processing system of claim 1, wherein the alternate medium comprises a time division multiplex (TDM)-based network.

10. The computer processing system of claim 1, wherein the emulation instructions include instructions that transmit information over the alternate medium in response to receive requests from the second serial device, the transmitted information including information representative of the receive request from the second serial device; and whereby transmissions to the first serial device by the operating system instructions are transmitted over the alternate medium and serial communication port communication is thereby emulated over the alternate medium.

11. The computer processing system of claim 1, wherein the BIOS or driver software instructions executed on said processor are associated with an interrupt service.

12. A method of emulating serial communication port communication over an alternative transport in a computer processing system having a processor including an operating system, comprising:
the operating system communicating a first message directly with a hardware interface of a first serial communication port device;
the first serial communication port device connected to the processor and operating under the control of the operating system, said first serial communication port device sending the first message from the operating system on to a receive port of a second serial communication port device;
the second serial communication port device connected to the processor and operating under the control of BIOS or driver software instructions executed on the same processor, the first and second serial communication port devices residing within said computer processing system, said second serial communication port device generating information indicative of the receipt of the first message;
emulation logic, in response to the generated information, conveying the first message on the alternative transport to thereby emulate serial communication port communication on the alternative transport.

13. The method of claim 12, further comprising:
receiving a second message on the alternative transport;
invoking the emulation logic in response thereto to receive information from the second message;
sending the received information to a transmit port of the second serial communication port device;
the second serial communication port device sending the received information to a receive port of the first serial communication port device; and
the operating system communicating with the first serial communication port device to process the received information.

14. The method of claim 12, wherein the emulation logic operates in response to events generated by the second serial communication port device.

15. The method of claim 12, wherein the hardware interface of the second serial communication port device communicates with at least one console device.

16. The method of claim 12, wherein the alternative transport comprises a packet-based network.

17. The method of claim 12, wherein the alternative transport comprises a cell-based network.

18. The method of claim 12, wherein the alternative transport comprises a frame-based network.

19. The method of claim 12, wherein the alternative transport comprises a time division multiplex (TDM)-based network.

20. The method of claim 12, wherein the BIOS or driver software instructions executed on the same processor are associated with an interrupt service.

* * * * *